United States Patent
Rudolph

(10) Patent No.: US 10,875,245 B2
(45) Date of Patent: Dec. 29, 2020

(54) SYSTEM AND METHOD FOR DISPENSING COMPOSITE FILAMENTS FOR ADDITIVE MANUFACTURING

(71) Applicant: AREVO, INC., Santa Clara, CA (US)

(72) Inventor: Natalie Margaretha Rudolph, Santa Clara, CA (US)

(73) Assignee: AREVO, INC., Milpitas, CA (US)

( * ) Notice: Subject to any disclaimer, the term of this patent is extended or adjusted under 35 U.S.C. 154(b) by 325 days.

(21) Appl. No.: 16/013,147

(22) Filed: Jun. 20, 2018

(65) Prior Publication Data

US 2019/0176391 A1   Jun. 13, 2019

Related U.S. Application Data

(60) Provisional application No. 62/596,490, filed on Dec. 8, 2017.

(51) Int. Cl.
| | |
|---|---|
| *B33Y 30/00* | (2015.01) |
| *B29C 64/209* | (2017.01) |
| *B29C 64/165* | (2017.01) |
| *B33Y 70/00* | (2020.01) |
| *B33Y 10/00* | (2015.01) |
| *B29K 105/12* | (2006.01) |
| *B29C 64/336* | (2017.01) |
| *B29C 64/106* | (2017.01) |
| *B29C 64/307* | (2017.01) |

(52) U.S. Cl.
CPC .......... *B29C 64/209* (2017.08); *B29C 64/165* (2017.08); *B33Y 10/00* (2014.12); *B33Y 30/00* (2014.12); *B33Y 70/00* (2014.12); *B29C 64/106* (2017.08); *B29C 64/307* (2017.08); *B29C 64/336* (2017.08); *B29K 2105/12* (2013.01)

(58) Field of Classification Search
CPC ..... B29C 64/209; B29C 64/165; B33Y 10/00; B33Y 30/00; B33Y 70/00
See application file for complete search history.

(56) References Cited

U.S. PATENT DOCUMENTS

| | | |
|---|---|---|
| 4,913,889 A | 4/1990 | Takai et al. |
| 9,895,845 B2 | 2/2018 | Bheda et al. |
| 9,908,978 B2 | 3/2018 | Reese et al. |
| 2014/0232035 A1 | 8/2014 | Bheda |
| 2016/0176118 A1 | 6/2016 | Reese et al. |
| 2016/0236414 A1 | 8/2016 | Reese et al. |

(Continued)

FOREIGN PATENT DOCUMENTS

| | | |
|---|---|---|
| EP | 3135734 A1 | 1/2017 |
| WO | 2017210490 A1 | 12/2017 |

OTHER PUBLICATIONS

PCT International Search Report, International Application No. PCT/US2018/063585, dated Feb. 18, 2019.

(Continued)

*Primary Examiner* — Jacob T Minskey
(74) *Attorney, Agent, or Firm* — Botos Churchill IP Law LLP

(57) ABSTRACT

A nozzle for dispense of a material that is a composite of fillers such as short fibers (e.g. carbon fibers) and a polymer matrix. The nozzle through which the composite material is dispensed has an expansion region through which the composite material flows. The expansion region dispenses a composite material wherein the fibers are substantially not aligned (e.g. in a random orientation with respect to each other in the polymer matrix).

24 Claims, 1 Drawing Sheet

(56) References Cited

U.S. PATENT DOCUMENTS

| | | |
|---|---|---|
| 2016/0266573 A1 | 9/2016 | Bheda et al. |
| 2016/0271880 A1 | 9/2016 | Bheda et al. |
| 2016/0297142 A1 | 10/2016 | Bheda et al. |
| 2017/0015061 A1 | 1/2017 | Lewicki et al. |
| 2017/0096576 A1 | 4/2017 | Bheda |
| 2017/0198104 A1 | 7/2017 | Bheda et al. |

OTHER PUBLICATIONS

PCT Written Opinion of the ISA, International Application No. PCT/US2018/063585, dated Feb. 18, 2019.

Heinle, C., et al., "Thermal Conductivity of Polymers Filled with Non-isometric Fillers: A Process Dependent, Anisotropic Property", pp. 8, (Jan. 2009).

Skrabala, O., et al., "Enhanced Thermal Conductivity in Plant-shaped Polymer Parts", AIP Conf. Proc. vol. 1593, pp. 424-427, (2014).

SYSTEM AND METHOD FOR DISPENSING COMPOSITE FILAMENTS FOR ADDITIVE MANUFACTURING

CROSS REFERENCE TO RELATED APPLICATION

The present invention claims priority to U.S. Provisional Application No. 62/596,490 that was filed on Dec. 8, 2017, the disclosure of which is incorporated by reference herein in its entirety.

BACKGROUND OF THE INVENTION

Additive manufacturing has been utilized for printing three-dimensional parts by depositing successive layers of material in an automated manner. Prototyping is the most common application for additive manufacturing. The additive manufacturing process is widely known as the three-dimensional ("3D") printing of objects. Techniques of additive manufacturing include, without limitation, directed energy deposition (an additive manufacturing process in which focused thermal energy is used to fuse materials by melting as they are being deposited); material extrusion (an additive manufacturing process in which material is selectively dispensed through a nozzle or orifice); material jetting (an additive manufacturing process in which droplets of UV curable materials are selectively deposited and cured); powder bed fusion (an additive manufacturing process in which thermal energy selectively fuses regions of a powered bed); sheet lamination (an additive manufacturing process in which sheets of material are bonded to form an object); vat polymerization (an additive manufacturing process in which liquid photopolymer in a vat is selectively cured by light-activated polymerization); and powder/binder jetting (a process by which a liquid bonding agent is selectively deposited to join powder materials). In some of these techniques, a material (e.g., a heated and/or pressurized thermoplastic) may pass through a print head or nozzle. The print head may be moved in a predefined trajectory (e.g., a tool path) as the material discharges from the print head, such that the material is laid down in a particular pattern and shape of overlapping layers. The material, after exiting the print head, may harden into a final form. Many methods involve the deposition of thin layer of thermoplastic or thermoset materials.

There are manufacturing processes that dispense a melted or liquified polymer or carbon impregnated polymer liquid formed from either a mixing device such as an extruder or a tape placement device. Heinle, C. et al. "Thermal Conductivity of Polymers Filled with Non-isometric Fillers: A Process Dependent, Anisotropic Property," (January 2009) investigated the effects of fiber orientation on the properties of an impregnated polymer matrix. Skrabala, O., et al. "Enhanced Thermal Conductivity in Plate-shaped Polymer Parts," AIP Conf. Proc. Vol. 1593, pp. 424-427 (2014) report that anisotropic thermal conductive fillers such as conductive fibers are used to increase the thermal conductivity of polymers impregnated with such fibers. Both of these references are incorporated by reference herein.

Fibers are high aspect ratio fillers. Controlling fiber orientation in a liquified polymer matrix used in additive manufacturing has proven challenging due to the tendency of the fibers to orient themselves lengthwise based on the velocity gradient across channels. Due to such velocity gradients, the fibers closest to the walls are oriented lengthwise in the flow direction and the fibers in the center are aligned, lengthwise, perpendicular to the flow direction. The fibers in the cross-sectional region of the channel between the wall and center align themselves lengthwise based on the velocity gradient from the walls to the center, and therefore their lengthwise alignment varies from 0° (i.e. aligned with the flow direction) to 90° (i.e. perpendicular to the flow direction). Although the fiber orientation changes along the cross-section of the channel through which the liquified fiber matrix flows, the fibers are aligned with respect to neighboring fibers and are not randomly misaligned along the channel cross-section.

Variations in fiber alignment in the liquified matrix is illustrated in FIG. 1. FIG. 1 illustrates a nozzle 110 wherein the fibers impregnated in the liquified matrix/filler composite 120 demonstrate the above-described alignment profile (where fibers positioned along the walls are at approximately 0° degrees lengthwise relative to the direction of flow at the wall; the fibers positioned nearer the center of the flow channel are aligned lengthwise in an orientation of about 90° relative to the direction of flow 160 and the fibers in the cross-section of the channel between the wall and the center have an orientation relative to the direction of flow that varies with their position in the channel. The fiber-impregnated matrix 120 then passes through a narrow channel 130 prior to being dispensed. As can be seen, the fibers 140 all align when dispensed from the narrower channel portion of the nozzle 130. Consequently, the fiber orientation varies with the velocity profile along the cross-sectional area of the nozzle. As noted above, it is challenging to control the fiber orientation because of these influences. Accordingly, improvement in methods and equipment for dispensing filler-impregnated matrices continue to be sought.

BRIEF SUMMARY OF THE INVENTION

Described herein are an apparatus and method that provides a filler impregnated polymer matrix for additive manufacturing (i.e., 3D printing). In the present invention a liquid or semi-liquid or solid polymer matrix is mixed with fillers such as one-dimensional carbon fibers. Fibers are referred to as one-dimensional because they have a very high aspect ratio of length to width. The mixture of polymer/carbon fibers, referred to as a composite filament material herein, is dispensed from the nozzle for additive manufacturing. Other fillers, referred to as two-dimensional fillers, are also contemplated herein. The fillers are described as two-dimensional because their aspect ratios are closer to 1. Examples of two dimensional fillers include metal flakes (e.g. aluminum flakes), graphene, metal platelets, etc.

As described in detail below, the fillers have an orientation in the polymer matrix that is affected by a variety of factors. The apparatus and method provide a polymer matrix in which the orientation of the fibers is a target orientation, rather than an orientation that is simply the passive result of the nozzle dimensions and the material characteristics of the polymer matrix and fillers, and the rate at which the composite filament material flows through the nozzle.

Examples of methods, systems and materials that may be used to create or generate objects or parts herein by additive manufacturing are provided in U.S. Patent Publication Nos. 2014/0232035, 2016/0176118, and U.S. patent application Ser. No. 14/297,185 (published as US20170198104 A1), Ser. No. 14/621,205 (published as US20160236414 A1), Ser. No. 14/623,471 (published as US20160236416A1 and U.S. Pat. No. 9,895,845), Ser. No. 14/682,067 (published as US20160297935 A1 and U.S. Pat. No. 9,908,978), Ser. No. 14/874,963 (published as US20170096576 A1), Ser. No.

15/069,440 (published as US20160266573 A1), Ser. No. 15/072,270 (published as US20160271880 A1), Ser. No. 15/094,967 (published as US20160297142 A1), each of which is entirely incorporated herein by reference.

As described above, the dispensed material is a composite filament material. "Composite" as used herein is a material made of at least two distinct materials. The composite is referred to herein as a filament because of the manner in which it is dispensed. The apparatus described herein is a nozzle that dispenses the composite filament material as a continuous bead (i.e., a filament). In one embodiment, the composite filament material is a polymer with carbon fibers distributed therein. In some embodiments, the at least one composite filament material is a continuous fiber composite comprising a thermoset polymer/carbon fiber composite material in which the thermoset polymer has a curing temperature that is above the temperature at which the filament is dispensed.

In some embodiments, the composite filament material has a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. The cross-sectional shape is defined by the nozzle orifice from which the composite filament material is dispensed. Consequently, the nozzle conduit, which imposes its shape onto the composite filament that flows through the conduit, can have any of the above-identified cross sections. In some embodiments, the composite filament material dispensed by the nozzle has a diameter (or other measure of distance from one side of the filament to the other in filament cross-section) of about 0.1 millimeters to 5 millimeters.

A composite material to be dispensed by the nozzle described herein is formed by known means such as extrusion, mixing, etc. Once the composite material is formed it is dispensed onto a substrate for additive manufacturing. Such dispense occurs through a nozzle or die. In order to dispense a composite material with fillers such as fibers in a target orientation relative to each other thereby dispensing a composite filament with isotropic properties or increased shear strength, the nozzle provides an expansion region through which the composite filament material passes just prior to dispense. The expansion region is downstream from a contraction region in which the channel diameter narrows from the larger diameter channel in which the filler and matrix are heated to facilitate flow through the nozzle. Consequently, the nozzle described herein has three distinct regions; i) the larger diameter channel region; ii) the narrower contraction region; and iii) the expansion region which transitions from a smaller cross-sectional area at the nozzle interface to a larger cross-sectional area at the dispense orifice.

The expansion region induces a radial flow in the composite material due to the second order normal stresses as it passes from the narrower contraction region into and through the nozzle expansion region, which results in a more random orientation of the fibers in the composite material dispensed from the nozzle. Expansion region, as used herein, is a conduit for the composite material with a larger maximum cross-sectional area than the cross-sectional area immediately preceding it. The dimensions of the expansion region are selected to provide a composite material having the target fiber orientation. In one embodiment the nozzle conduit through all three regions has a circular cross-section. In the embodiments wherein the cross-section is circular, the diameter of the expansion region conduit exceeds that of the contraction region immediately preceding it through the length of the expansion region. Typically, the diameter of the expansion increases gradually throughout its length in the direction of the flow of the composite material through the expansion region. However, other cross-section geometries are contemplated. For example, the cross-section can be oval or elliptical. The selected nozzle conduit cross-sectional geometry is also selected to influence the orientation of the fillers or fibers. In some embodiments the cross-sectional area of the conduit abruptly changes from the smaller cross-section of the contraction region to the larger cross-section of the expansion region but the cross-section of the expansion region remains approximately constant along its length. However, the transition in the cross-sectional area from the contraction region conduit to the expansion region cannot be so abrupt and so short that the composite filament is dispensed without reaching the walls of the expansion zone. Consequently, the expansion region dimensions are selected to permit die swell of the composite filament but ensure that the composite filament reaches to the walls of the expansion region prior to dispense. In some embodiments, the length of the expansion region is as long or longer than the length of the contraction region, as this will allow the fillers to forget the orientation imposed on them in the contraction region and assume the target filler orientation that the dimensions of the expansion region were selected to impart. However, one of skill in the art will understand that the cross-sectional area and cross-sectional geometry of the conduit in the expansion region has a greater influence on filler orientation than the length of the expansion region.

In other embodiment, the cross-sectional area of the nozzle increases in the direction of flow of the composite material through the nozzle. In one embodiment, the ratio of the diameter of the larger diameter expansion region to the diameter of the narrower contraction region is from about 5 to about 1 to about 1.5 to about 1.

DETAILED DESCRIPTION

The system and method described herein improves the shear strength of composite materials for the fabrication, via additive manufacturing, of parts (or, more generally, "objects") using filaments that are a composite of at least one polymer matrix and fillers such as carbon fibers. Examples of polymers include thermoplastic polymers, which include, but are not limited to polyether ether ketone (PEEK), polyamide (PA), polyether sulfone (PES), polyphthalamide (PPA), polyetherimide (PEI), polyphenylene oxide (PPO), polypropylene (PP), and polyethylene (PE). Examples of thermoset polymers include, but are not limited to, polyurethanes, epoxies and acrylics.

In the illustrative embodiment, a modified fused filament fabrication (FFF) system and method are used to fabricate ("print") the composite objects.

In one embodiment, the materials used to make the composite filament material are extruded together to render the composite material. In the extruder, the polymer matrix material is heated to facilitate mixing and to permit the polymer to flow. The extrusion of the composite filament can occur either in the nozzle or, more typically, the composite filament is extruded outside of the nozzle and is re-melted in the nozzle. In accordance with one embodiment, the mixing of the fibers with the polymer matrix is performed at a temperature at which the polymer is fluid.

In those embodiments where the polymer matrix is a thermoset resin that cures upon heating and/or over time, the composite filament material is extruded through the nozzle without additional heat so that the matrix remains essentially uncured when the composite filament is dispensed from the nozzle. In such embodiments, the additives such as rheology enhancers are used to increase the viscosity of the composite filament when it is dispensed, to hinder the ability of the composite filament to flow freely after dispense. Such rheology enhancers are well known to one skilled in the art and not described in detail herein. As time passes after dispense or heat is applied, the composite filament begins to cure and flow of the composite filament is less of a problem that requires remediation.

When dispensed, the composite filament material flows from the nozzle and is deposited on the substrate. In one embodiment, the print head nozzle from which the liquid composite is dispensed is traversed over the substrate.

Figure 1:
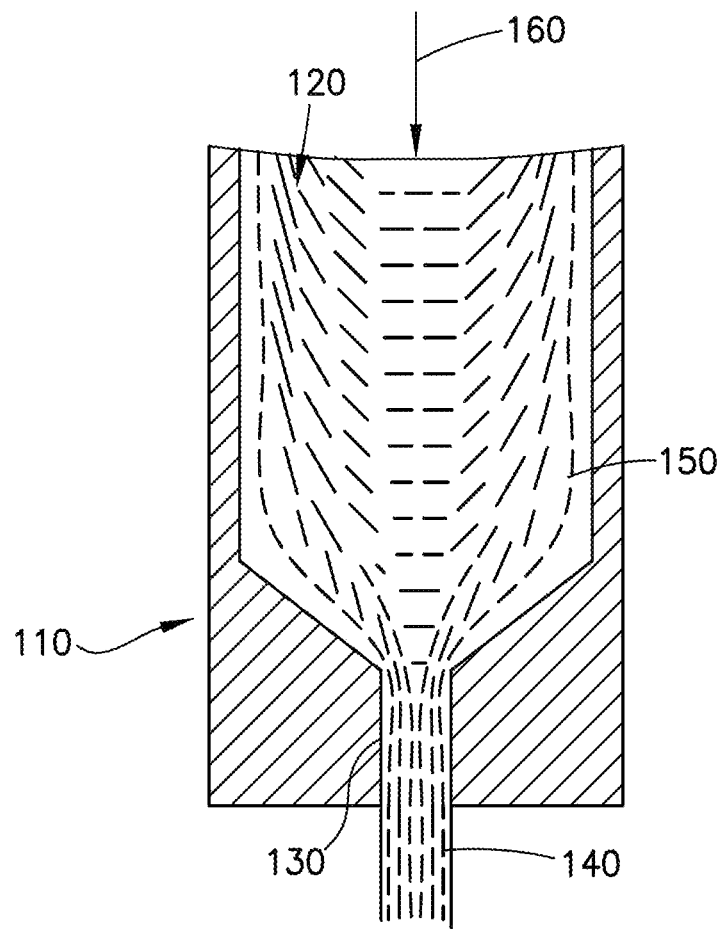
FIG. 1 illustrates a polymer being dispensed by a nozzle with the fibers in an aligned orientation.
Figure 2:
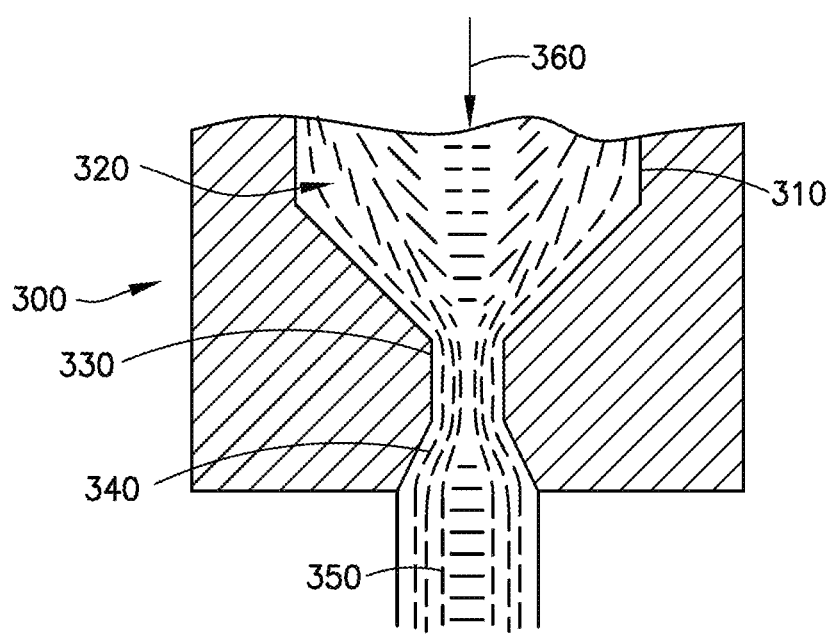
FIG. 2 illustrates a nozzle with a contraction region followed by an expansion region and its effect on the orientation of short fibers in a polymer matrix.

As illustrated in FIG. 2, a nozzle 200 has a conduit with an approximately circular cross-section. The heated composite material first flows through the larger diameter channel region 310. Examples of larger diameter dimensions are diameters of about 25 mm to about 1.5 mm. The larger diameter channel region 310 tapers to a smaller diameter contraction region 330. Examples of smaller diameter dimensions for the contraction region are in the range of about 8 mm to about 0.3 mm. Although the range of dimensions for the larger diameter channel region overlaps with the range of dimensions for the smaller diameter contraction region, for any nozzle structure the diameter of the larger diameter channel region must be greater than the diameter of the smaller diameter contraction region 330. This taper to the smaller diameter nozzle causes fibers 340 in the composite material 320 flowing from the larger diameter conduit region to the smaller diameter contraction region 330 to align. A gradual taper is preferred since an abrupt transition from a first larger diameter conduit 310 to a second smaller diameter nozzle 330 can cause the composite material to build up in the region adjacent the entering orifice of the nozzle 330, which could cause a clog in the nozzle 330. When dispensed, if the composite material 320 is released into a region of larger diameter 340 (or even infinite diameter) some of the fibers in the composite material will reorient. As illustrated in FIG. 2, the volume of region 310 exceeds that of region 330.

FIG. 2 therefore illustrates a nozzle 300 with a contraction region having a narrower cross-sectional area that works in conjunction with a downstream controlled expansion zone 340 that will cause the fillers in the composite material that align in the direction of flow in the contraction region to reorient and randomize as the composite material travels through the expansion zone. The expansion region 340 is illustrated with an increasing cross-section from the narrower contraction region. In the embodiment illustrated in FIG. 2, the largest cross section of the expansion region remains smaller than the cross section of the channel region. The fibers 350 are somewhat aligned when passing through the nozzle 330 but have a more random orientation with respect to each other when dispensed from the nozzle 300 after flowing through expansion region 340.

The fiber orientation response to the changes in flow conditions imposed on the composite material by the flow of the composite material through the reduced diameter contraction region 330 followed by the expansion zone 340 can be explained by the stresses exerted on the polymer molecules. Such stresses are described in Osswald, Tim, et al., Material Science of Polymers for Engineers ISBN 978-1-56990-514-2 (3d. ed., Carl Hanser Verlag), which is incorporated by reference. As explained in Osswald et al., polymers will respond to shear flow by "curling" up. The polymer response in turn exerts stress on the fluid. Such stresses are known as deviatoric stresses. Stress differences can be measured in directions normal to the direction of flow. These stress differences are material dependent (i.e. the viscosity of the material and other properties will affect the measured normal stress differences (which are calculated based on material functions)).

Elastic effects during flow are measured by the Deborah number, which is defined as:

$$De = \frac{\lambda}{t_p} \qquad (1)$$

In the above equation, $\lambda$, is the relaxation time of the polymer and $t_p$ is the process time. The process time is the ratio of the die dimension (i.e. the length of the conduit through which the polymer flows) and the average speed through the die. A Deborah number of zero in a viscous fluid and an infinite Deborah number is an elastic solid. As the Deborah number increases above 1, the polymer does not have time to relax from shear stresses imposed on the polymers resulting in deviations in the polymer flowing through the die.

These deviations introduce randomness to fiber orientation, as illustrated in FIG. 2. As noted above, the stresses to which a polymer is subjected when flowing through a die can vary depending upon the die cross section, with the stresses at the wall being greater than the stresses on the polymer closer to the center of the channel in the die. The orientation of the fillers (e.g. fibers) is affected by the stresses imposed on the polymer. In the high stress regions nearer the walls of the conduit, the fibers are aligned with the flow direction. In the lower stress regions near the center of the conduit, the lower stress on the polymer allows the fibers in the polymer to reorient in a direction that is orthogonal to the flow direction.

As the polymer passes through the narrower contraction region 330, the stresses on the polymer become more uniform. This results in the fibers being oriented in a direction approximately parallel to the direction of the flow of the composite material through the die across the entire nozzle cross section. The dimensions of the wider expansion region 340 are selected to ensure that the polymer "forgets" its shape in the narrower nozzle cross section, allowing the fibers to reorient in response to the relaxation of the polymers that result from the reduced stress on the polymer in the center of the expansion zone.

As noted above, there are several variables that affect the ability of the nozzle 300 to impart the desired randomness to the fiber orientation in the polymer matrix material. Those variables include the viscosity of the composite material 320, the flow rate (i.e. speed) of the composite material 320 in the nozzle. The cross-sectional area of the three regions of the nozzle (i.e. the upstream conduit 310, the contraction region 330 and the expansion region 340). The length of the three nozzle regions (i.e. the upstream conduit 310, the contraction region 330 and the expansion region 340) is also a factor. The length of the expansion region is particularly important as it must be long enough to ensure that the polymer in the composite material "forgets" or otherwise "relaxes" from the stresses imposed on the polymer as it flows through the contraction region 330. The higher the viscosity of the material, the greater the length of the expansion region 340 required to permit the polymer in the composite material to relax, allowing the orientation of the fibers in the composite material to randomize. The process and nozzle design parameters described above can be adjusted to tailor the orientation of the fillers/fibers in the polymer matrix as described herein.

As the composite material flows through the upstream conduit, 310, the composite material is heated to a melt state. The temperature to which the composite material is heated is largely a matter of design choice. Examples of typical melt temperatures are in the range of about 150° C. to about 450° C. The selected temperature depends on the specific thermoplastic selected for the matrix. Lower temperatures are used for commodity thermoplastics while higher temperatures are used for high performance thermoplastics.

The material from which the nozzle 300 is made is largely a matter of design choice. In one embodiment, the nozzle is made of brass, which has a high heat conductivity. In other embodiments, the nozzle is made of hardened steel, which does not have the high heat conductivity of brass but is less abrasive to the composite material that is dispensed by the nozzle 300.

As noted above, fiber fillers (referred to herein as one-dimensional fillers) have very high aspect ratios of length to width, while fillers such as graphene and metal platelets have aspect ratios closer to 1 (herein referred to as two dimensional fillers). While the orientation of the fillers has been described herein in terms of one-dimensional fiber fillers, the effects on the orientation of fiber fillers described herein equally affect two-dimensional fillers.

The composite dispensed from the nozzle 300 is a controlled size bead or filament with embedded fillers, (e.g. fibers) that are oriented in a more random, less aligned manner. The skilled person will appreciate that the degree of filler/fiber randomness or orientation in the three-dimensional space occupied by the composite filament is a matter of design choice and can be influenced by nozzle design (e.g. the differences in cross-sectional areas and length of the sections of the nozzle through which the composite material flows prior to dispense therefrom). Said another way, filler/fiber randomness can be controlled in any one or more of the x-y, x-z and y-z planes.

In one embodiment the dispense end of the expansion region has a larger cross-section and a different geometry than the cross-section of the dispense end at the interface with the contraction region. For example, the geometry of the cross-section of the conduit that passes through the expansion region can change from circular to elliptical such that the filler orientation of the composite material changes from an uncontrolled first orientation (i.e. the more aligned orientation associated with the filler alignment in the contraction region) to a target orientation that is obtained by the selection of the length, conduit cross-section and conduit cross-section geometry of the expansion region.

In some embodiments, the dispensed filament is pressed into place with a compaction roller. Use of compaction rollers when depositing filaments for 3D printing is known and described in PCT/US2017/03551, published as WO/2017/210490 to Reese et al., which is incorporated by reference herein. Since the composite filament is melted when dispensed onto the substrate, the composite filament can flow onto or otherwise fuse to adjacent filaments which are also partially reheated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for dispensing a composite material comprising:
   combining a polymer material matrix with a plurality of fillers to form a composite material;
   flowing the composite material through a nozzle, the nozzle comprising a continuous conduit from a first end to a second end, the continuous conduit comprising a channel region with a cross-section;
   flowing the composite material from the channel region into a contraction region wherein the cross-section of the channel region is larger than a cross-section of the contraction region;
   flowing the composite material from the contraction region to an expansion region in the nozzle, wherein the expansion region has a center region and at least one wall defining a cross-section that is larger than the cross-section of the contraction region, and a ratio of a diameter of the expansion region to a diameter of the contraction region is from about 5:1 to about 1.5:1;
   flowing the composite material through the expansion region wherein a length and the cross-section of the expansion region are selected to cause an orientation of the fillers in the composite material to change from a first orientation at an interface of the contraction region with the expansion region to a target orientation as the composite material flows through the expansion region, wherein the target orientation comprises fillers nearer to the at least one wall of the expansion region aligning in an orientation that is substantially parallel to a flow direction of the composite material and the fillers nearer to the center region of the expansion region aligning in an orientation that is substantially orthogonal to the flow direction of the composite material; and
   dispensing the composite material from the expansion region of the nozzle.

2. The method of claim 1 wherein the plurality of fillers is a plurality of high aspect ratio fibers.

3. The method of claim 2 wherein the high aspect ratio fibers are carbon fibers.

4. The method of claim 1 wherein the plurality of fillers is a plurality of low aspect ratio fibers selected from the group consisting of graphene, metal flakes and metal platelets.

5. The method of claim 1 wherein the cross-section of the expansion region increases from a smaller cross-section at the interface with the contraction region to a larger cross-section at a dispense end of the expansion region.

6. The method of claim 5 wherein the smaller cross-section of the expansion region has a first geometry and the larger cross-section of the expansion region has a second geometry wherein the second geometry is selected to provide the target orientation.

7. The method of claim 6 wherein the smaller cross-section of the expansion region has a circular geometry and the larger cross-section of the expansion region has an elliptical geometry.

8. The method of claim 5 wherein a ratio of a distance across a larger cross-section at the dispense end of the expansion region to a distance across a smaller cross-section at the interface with the contraction region is about 5 to about 1 to about 1.5 to about 1.

9. The method of claim 1 wherein the continuous conduit comprises a circular cross-section.

10. The method of claim 1 wherein the continuous conduit comprises a cross-section geometry selected from the group consisting of circle, ellipse, parabola, hyperbola, convex polygon, concave polygon, cyclic polygon, equilateral polygon, equiangular polygon, regular convex polygon, regular star polygon, tape-like geometry, and combinations thereof.

11. The method of claim 1 wherein a largest distance across the cross-section of the channel region and the expansion regions is in a range of about 1.5 millimeters to about 25 millimeters and a largest distance across the cross-section of the contraction region is about 0.3 millimeters to about 8 millimeters where the largest distance across the cross-section of the channel region and the expansion region is greater than the largest distance across the cross-section of the contraction region.

12. The method of claim 11 wherein the cross-sections of the channel region, the nozzle and the expansion region are selected from the group consisting of a circular cross-section and an elliptical cross-section.

13. The method of claim 12 wherein the cross-sections of the channel region, the nozzle and the expansion region are circular wherein a diameter of the channel region and the expansion regions is in a range of about 1.5 millimeters to about 25 millimeters and a diameter of the contraction region is about 0.3 millimeters to about 8 millimeters where a largest distance across the cross-section of the channel region and the expansion regions is greater than a largest distance across the cross-section of the contraction region.

14. The method of claim 1 wherein the polymer material matrix is selected from the group consisting of thermoplastic polymers and thermoset polymers.

15. The method of claim 14 wherein the thermoplastic polymer is selected from the group consisting of polyether ether ketone (PEEK), polyamide (PA), polyether sulfone (PES), polyphthalamide (PPA), polyetherimide (PEI), polyphenylene oxide (PPO), polypropylene (PP), and polyethylene (PE).

16. The method of claim 14 wherein the thermoset polymer is selected from the group consisting of polyurethanes, epoxies and acrylics.

17. The method of claim 14 further comprising heating the thermoplastic polymer to a temperature of about 150° C. to about 450° C. as the thermoplastic polymer flows through the nozzle.

18. A nozzle for dispensing a composite material comprising:
a continuous conduit from a first end of the nozzle to a second end of the nozzle the continuous conduit comprising:
a channel region with a cross-section;
a contraction region with a cross-section wherein the cross-section of the channel region is larger than the cross-section of the contraction region and wherein the cross-section of the channel region tapers from a first cross-section proximate the first end of the nozzle to a second cross-section proximate to the contraction region; and
an expansion region having at least one wall defining a cross-section that is larger than the cross-section of the contraction region, wherein the cross-section of the expansion region increases from a smaller cross-section at an interface with the contraction region to a larger cross-section at a dispense end of the nozzle, wherein a ratio of a diameter of the expansion region to a diameter of the contraction region is from about 5:1 to about 1.5:1, wherein a length and the cross-section of the expansion region are selected such that the nozzle, in operation, changes an orientation of high aspect ratio fibers in the composite material from a first orientation at an interface of the contraction region with the expansion region to a target orientation as the composite material flows through the expansion region, and wherein the target orientation is such that fibers nearer to the at least one wall of the expansion region are oriented substantially parallel to a flow direction of the composite material and fibers nearer to a center region of the expansion region are oriented substantially orthogonal to the flow direction of the composite material.

19. The nozzle of claim 18 wherein a ratio of a distance across the larger cross-section at the dispense end of the expansion region to a distance across the smaller cross-section at the interface with the contraction region is about 5 to about 1 to about 1.5 to about 1.

20. The nozzle of claim 18 wherein the continuous conduit comprises a circular cross-section.

21. The nozzle of claim 18 wherein the continuous conduit comprises a cross-sectional geometry selected from the group consisting of circle, ellipse, parabola, hyperbola, convex polygon, concave polygon, cyclic polygon, equilateral polygon, equiangular polygon, regular convex polygon, regular star polygon, tape-like geometry, and combinations thereof.

22. The nozzle of claim 18 wherein a largest distance across the cross-section of the channel region and the expansion regions is in a range of about 1.5 millimeters to about 25 millimeters and a largest distance across the cross-section of the contraction region is about 0.3 millimeters to about 8 millimeters wherein the largest distance across the cross-section of the channel region and the expansion regions is greater than the largest distance across the cross-section of the contraction region.

23. The nozzle of claim 19 wherein the cross-section of the channel region, the nozzle and the expansion region are selected from the group consisting of a circular cross-section and an elliptical cross-section, wherein the cross-section of the channel region, the nozzle and the expansion region are same or different.

24. The nozzle of claim 21 wherein the cross-section of the channel region, the nozzle and the expansion region are circular wherein a diameter of the channel region and the expansion regions is in a range of about 1.5 millimeters to about 25 millimeters and a diameter of the contraction region is about 0.3 millimeters to about 8 millimeters wherein a largest distance across the cross-section of the channel region and the expansion regions is greater than a largest distance across the cross-section of the contraction region.

* * * * *